May 26, 1959  H. L. DUNLAP  2,887,963
FREIGHT LOADING CROSS BAR
Filed April 15, 1955  4 Sheets-Sheet 1
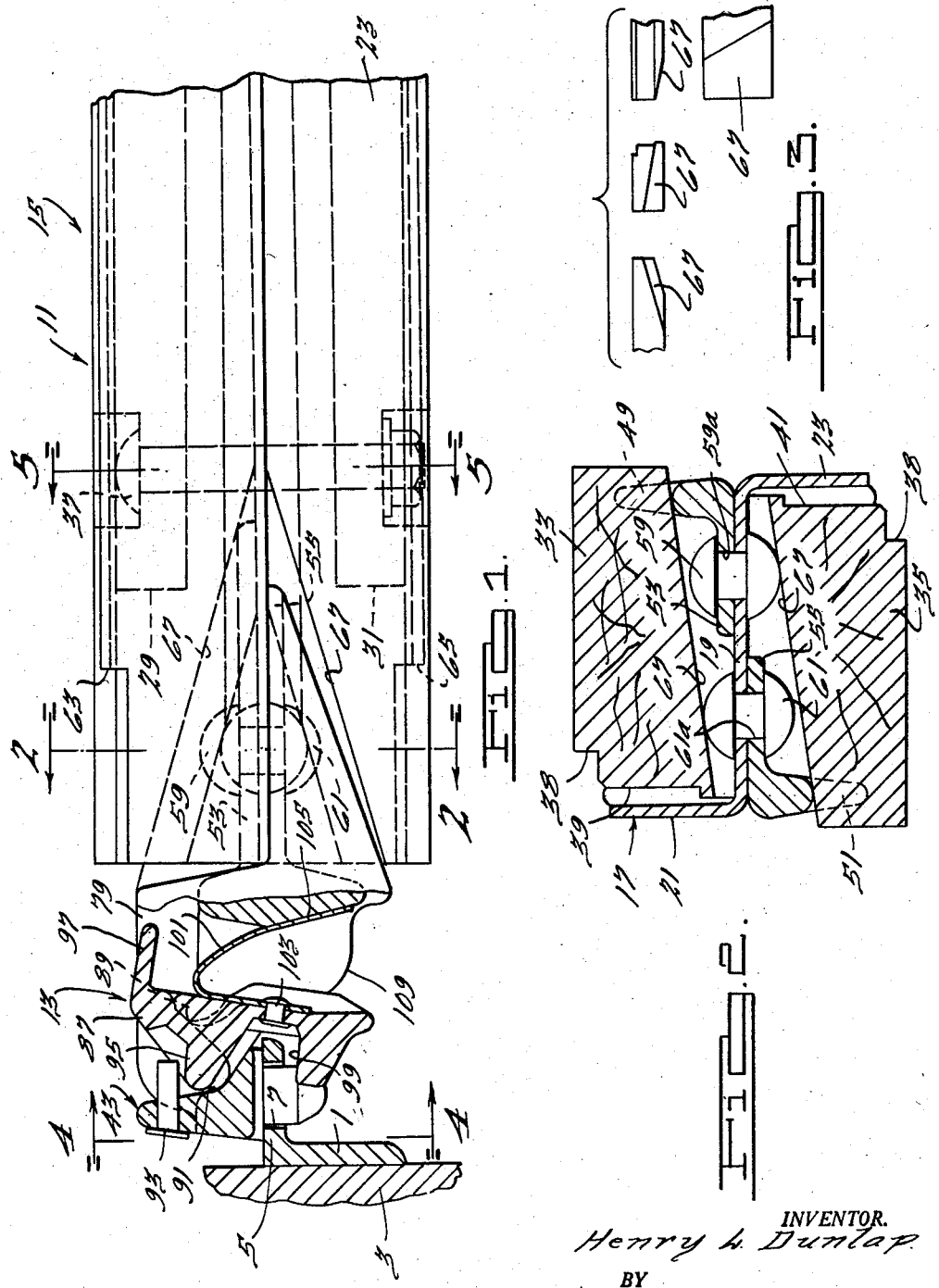
INVENTOR.
Henry L. Dunlap
BY
Harness, Dickey & Pierce
ATTORNEYS

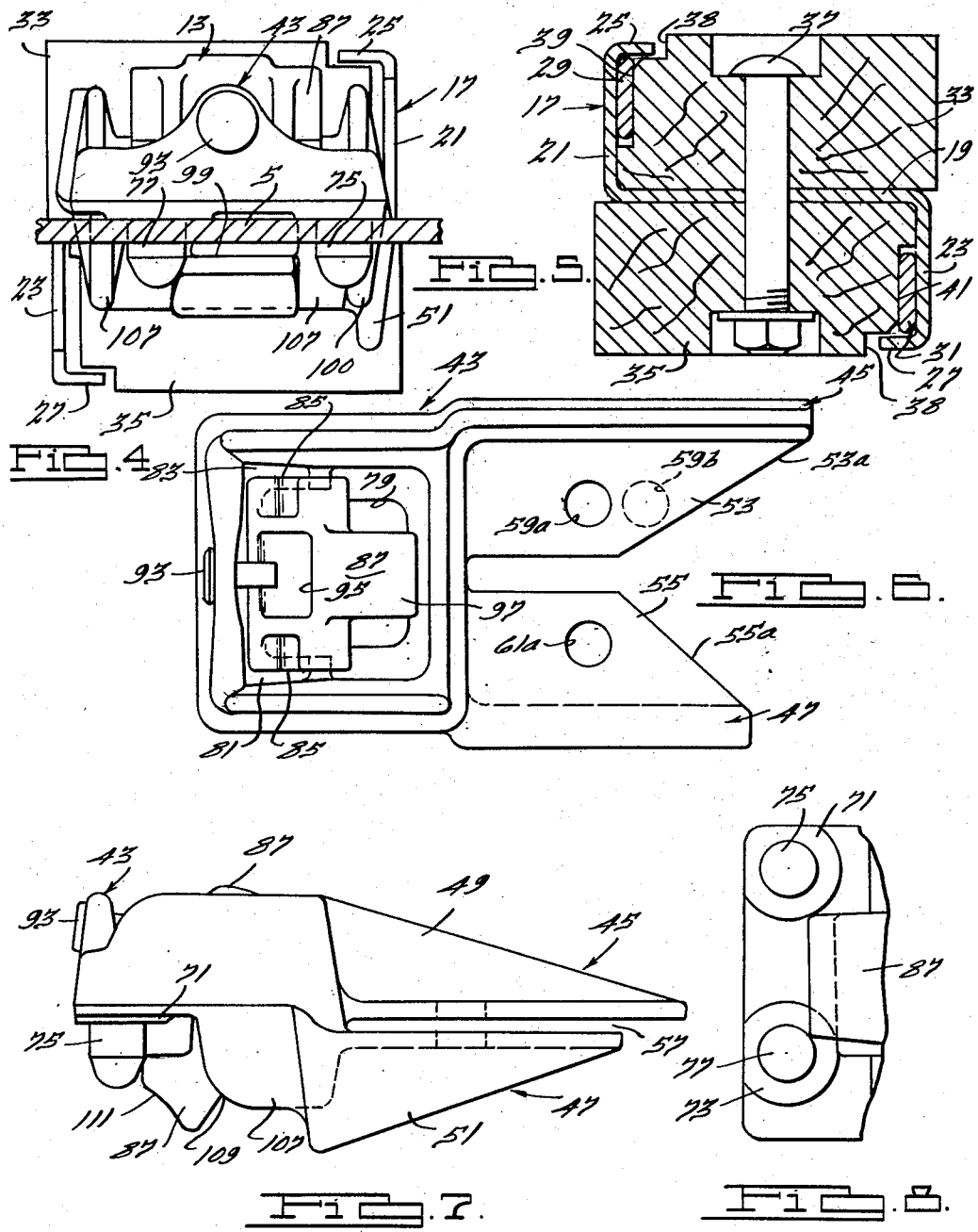

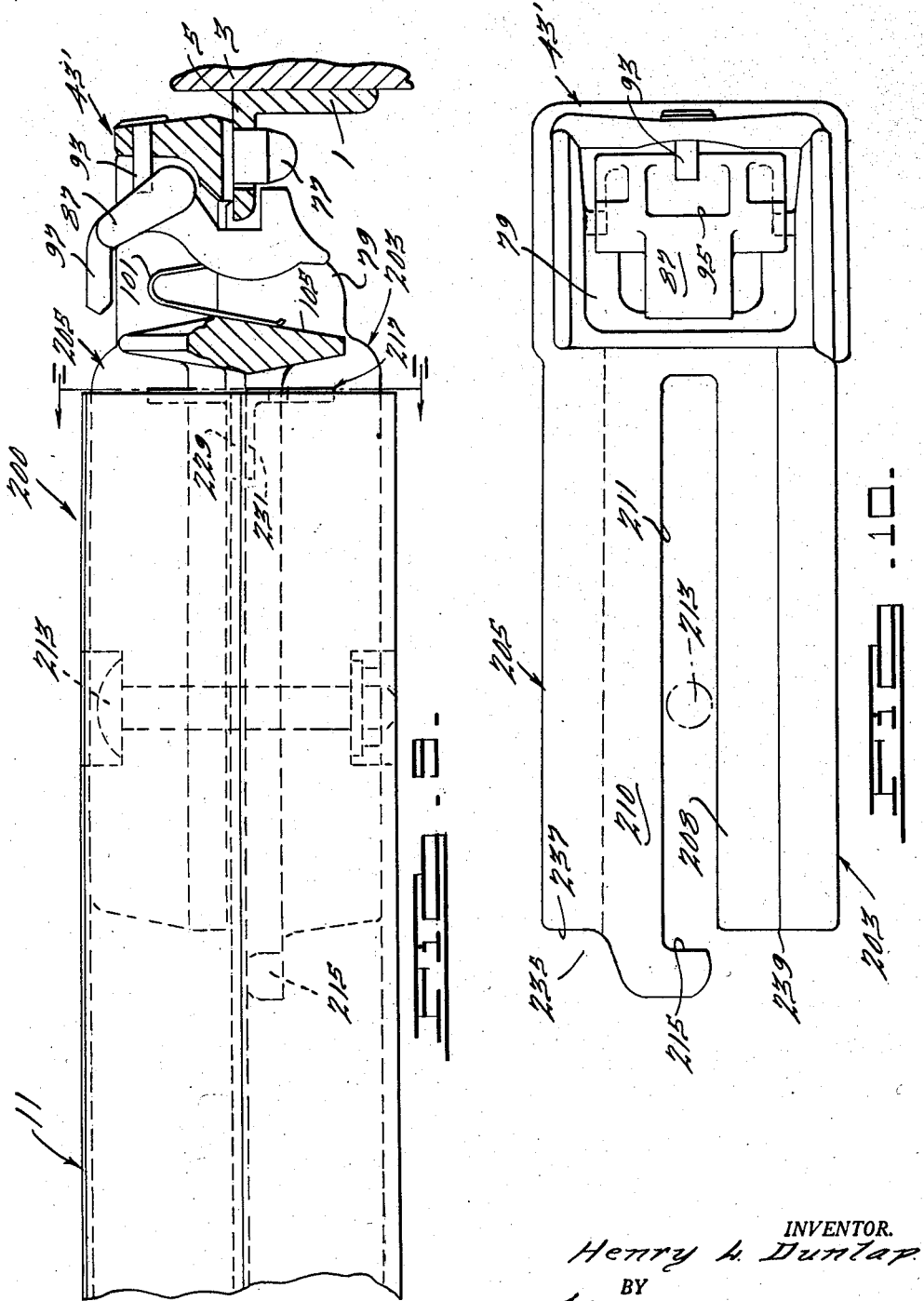

INVENTOR.
Henry L. Dunlap
BY Harness, Dickey & Pierce.
ATTORNEYS

United States Patent Office 2,887,963
Patented May 26, 1959

---

2,887,963

FREIGHT LOADING CROSS BAR

Henry L. Dunlap, Dearborn, Mich., assignor to Evans Products Company, Plymouth, Mich., a corporation of Delaware Application April 15, 1955, Serial No. 501,665

6 Claims. (Cl. 105—369)

My invention relates to freight holding constructions and, in particular, to cross bars such as used to brace articles of freight or to form constituent parts of freight stowage arrangements.

While freight bracing cross bars are subjected principally to ordinary beam loading, their structure is not simple because of the rather unusual requirements that must be met by them. These bars are most widely used in freight cars or in other conveyances wherein the stowed freight articles are subjected to forces of great magnitude accompanying acceleration and particularly deceleration of the conveyance. In order to properly accommodate these forces the cross bars are designed to be slightly resilient and the resiliency in a horizontal plane is preferably greater than in a vertical plane. Though subjected to very large loads, the freight bars must be light enough to be readily handled by workmen in the storage depots. Furthermore, the cross bars must present surfaces which will not damage the freight and into which nails can be driven. These various requirements have resulted in bars of composite construction, that is they are made up of various individual elements properly assembled together to make the completed cross bar. The composite construction brings with it problems of cost and assembly, of efficient use of material, and of stress raisers, i.e., irregularities of form creating localized stresses.

It is an object of this invention to provide a composite freight bar construction in which the material is efficiently used but in which irregularities of form are controlled so that there are no localized areas of stress.

Another object of the invention is to reduce the cost and simplify the problem of assembly.

The invention accomplishes these and other objects by means of a construction in which the end section of the cross bar commonly referred to as the "head" or "end fitting" has a highly efficient portion that engages and receives load from the body section of the bar. It is of a shape that minimizes section changes and reduces stress concentrations. It is of such a construction that it can be readily riveted to the body section thus eliminating the more expensive welding process which has in the past been the conventional way to obtain optimum joints between the end and body sections. Alternatively, it can be slidably connected to the body section in a telescopic joint of improved form.

The invention is illustrated in the accompanying drawings in which:

Figure 1 is a side elevation, partly in section and partly broken away, of the rigid end of a cross bar embodying the invention;

Fig. 2 is a cross section along the line 2—2 of Fig. 1;

Fig. 3 is a composite of several views of the end of the buffer bar showing the flat slice removed to permit the wood to clear parts of the end fitting;

Fig. 4 is an end view of the cross bar taken on line 4—4 of Fig. 1;

Fig. 5 is a cross section of the cross bar taken on line 5—5 of Fig. 1;

Fig. 6 is a plan view of the rigid end section unattached to the body section;

Fig. 7 is a side elevation similar to Fig. 1 but with the body section removed;

Fig. 8 is a bottom plan view of the outermost portion of the end section;

Fig. 9 is a side elevation partly broken away and partly in section of a telescopic end of a cross bar embodying features of the invention;

Fig. 10 is a plan view in detail of the end fitting used at the telescopic end of the cross bar as shown in Fig. 9;

Figure 11:
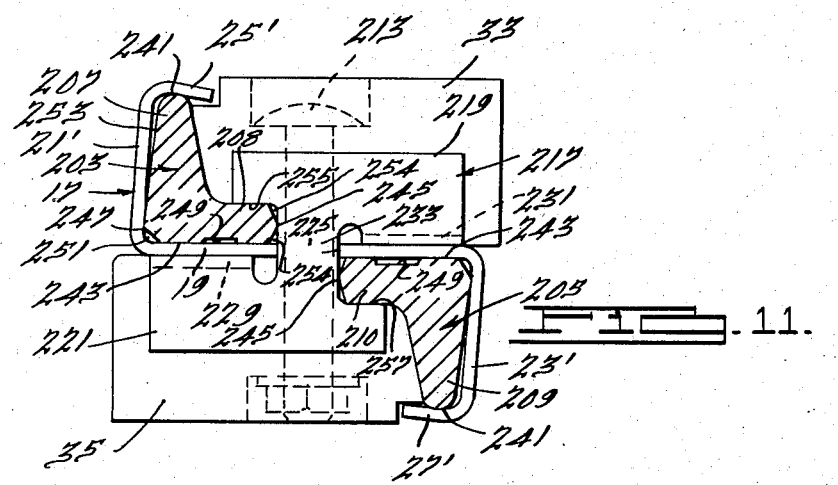
Fig. 11 is a section taken along the line 11—11 of Fig. 9.
Figure 12:
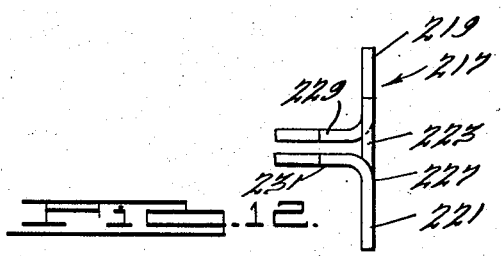
Fig. 12 is a detail side elevation of the reinforcement end plate used in the embodiments of Figs. 9 and 11.
Figure 13:
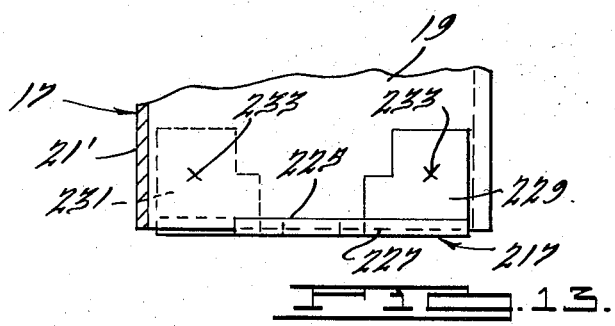
Fig. 13 is a plan view partly broken away and partly in section of the assembly of the reinforcement end plate 217 and the reinforcement plate 17.

While the invention may be used in connection with various types of cross bars, it is illustrated in the type of cross bar that is shown in more detail in U.S. Patent No. 2,497,683 assigned to the assignee hereof. According to the freight bracing system disclosed in that patent and in a divisional application thereof, Serial No. 119,942, filed Feb. 14, 1950 and issued as U.S. Patent No. 2,725,826, angle shaped support members 1 are secured along the sides 3 of a freight storage space. Each support member 1 has a horizontal flange or shelf 5 with a series of round holes 7 which serve as connecting points for the cross bars.

A cross bar 11 (Figs. 1–8) for connection to the support members 1 is shown best for purposes of general description in Figs. 1, 2, and 5. Only one end section of the cross bar is shown and this is of a non-telescopic nature. The other end of the cross bar can be telescopic, if desired, in accordance with the teachings of the patent and application referred to above or in accordance with other desired constructions, a preferred form being described hereinafter.

The bar 11 consists of an end section 13 and a body section 15. These two sections have rather widely differing jobs to perform and, as a consequence, their optimum constructions are quite different. However, since cross bars are subject to loads of great magnitude, particularly when used in a freight car to restrict fore and aft motion of freight, they are highly stressed since it is desirable to keep their weight to a minimum in order to permit ready handling by loading crews. Prior designs of cross bars have in general been of such a nature that the irregularities of form have tended to produce localized stresses. Since these cross bars are ordinarily a composite of separate end sections and body sections the areas of localized stresses are ordinarily found in the joint between an end section and the body section. This has been overcome by the structure of the present invention and particularly by the design of end section 13 which is such as to provide a gradual change or transition in effective areas between it and the body section 11.

The body section 11 preferably comprises a main metal reinforcing member 17 which is of S-shape throughout most of its length. Thus it has a central web 19 that extends transversely to the length of the bar 11 and across the width thereof and which is located substantially at the neutral axis or mid plane of the cross bar so far as bending under vertical loads is concerned, i.e., it is substantially horizontal or parallel to the shelves 5. The reinforcing member 17 has flanges 21 and 23 extending vertically from the web 19 in opposite directions and running substantially parallel to the length of the bar. The top corners of the flanges 21 and 23 are turned inwardly as shown at 25 and 27, respectively, to provide additional metal to resist bending. The flanges 21 and 23 may be reinforced and their section modulus increased by means of bars 29 and 31 which are spot welded thereto along the length of the bar, the reinforcements 29 and 31 preferably terminating approximately in the plane shown in Figure 1 which, as hereinafter brought out, is adjacent the innermost point of the connection between the end section 13 and the body section 15.

The reinforcing member 17 is the principal load carrying element of the body section 15. Since it is made of metal there is a possibility that it may damage articles of freight and, of course, it is not possible to readily drive nails into it. Because of this, a pair of wooden buffer members in the form of two-by-fours 33 and 35 are bolted by means of cross bolts 37 extending through the web 19 to the reinforcement 17 on opposite sides of the web 19. The buffer bars 33 and 35, as best seen in Fig. 5, are somewhat thicker than the flanges 21 and 23 so that they project beyond the top and the bottom thereof to provide the freight engaging surfaces of the body section 15. Furthermore, the cross bars 33 and 35 are wide enough so that they project on the left and right hand sides, respectively of the bar outwardly beyond the faces 21 and 23 to provide the freight engaging surfaces on the sides of the body section 15. The buffer bars 33 and 35 are suitably notched out or grooved out to accommodate the flanges 25 and 27, the groove 38 being provided for this purpose. They are also grooved out to receive the reinforcement elements 29 and 31 as shown by the grooves 39 and 41.

Turning now to the construction of the end section 13, the principal element thereof is a forged head or fitting 43, the shape of which is probably best seen in Figs. 6 and 7. As will be described later, the fitting 43 is provided with means for attaching it to the support member 1 to transmit load from the body section 15 to the side walls of the freight car or to the fixed supporting surface in the event that the cross bar is used in a storage chamber other than a freight car. The fitting 43 is secured to the reinforcement member 17 of the body section 15 by means of integral legs 45 and 47 which extend parallel to the length of the bar 11. The legs 45 and 47 are angle shaped and have tapered vertical flanges 49 and 51, respectively, that are substantially coplanar with the flanges 21 and 23 of the reinforcement element 17. The legs 45 and 47 have inwardly directed horizontal flanges 53 and 55 which are spaced vertically from each other by a distance 57 substantially the same as the thickness of the web 19 of reinforcing element 17. The end fitting 43 is assembled to the reinforcement member 17 by inserting the web 19 in the gap 57 so that the flange 53 rests on the top face of the web 19 and the flange 55 engages the bottom face of the web 19. Aligned holes are provided in the web 19 and the flanges 53 and 55 to receive the rivets 59 and 61. It may be noted here that the rivets 59 and 61 can be cold upset in a press simultaneously in the course of assembling the bar and to permit entry of the punch and die for performing this operation the flanges 25 and 27 of the reinforcement member 17 are cut away at points 63 and 65 so that the outermost section of the reinforcing element 17 is in substantially are shape of a Z as seen in Fig. 2. While the rivet holes 59a and 61a are shown in Figs. 1, 2, and 6 as lying in the same plane perpendicular to the longitudinal axis of the bar 11, it should be noted that these holes and the rivets can be offset longitudinally of the bar, for example, the hole 59a can be displaced to the position 59b shown in phantom lines in Fig. 6. The vertical flanges 49 and 51 are tapered as best seen in Fig. 7 to reduce the cross sectional area thereof toward the free ends of the legs 45 and 47. The horizontal flanges 53 and 55 are also tapered to reduce their cross sectional area as seen at 53a and 55a in Fig. 6. The top leg 45 is also somewhat longer than the bottom leg 47 as best seen in Fig. 7.

Because of the rivets 59 and 61 as well as the flanges 53 and 55 the buffer bars 33 and 35 must be cut away at their end portions. This cut surface 67 is the same on both bars 33 and 35 so that the bars are interchangeable. It is flat and oblique to both the vertical and horizontal faces of the bar. As best seen in Fig. 3 which is a composite of several views of the bar 33, the side of the bar which is not adjacent one of the flanges 49 or 51 has a relatively short slice so that it just clears the head of rivet 61. The slice 67, however, on the other side is on an angle which roughly corresponds to the angle taper of flange 49 or 51 so that the edge of the buffer bar 33 rests on the top of the flange. In the case of the bar 35, the cut 67 will enable the bar to just clear or rest on the rivet 59 and to be supported by the flange 51. The selection of the particular type of slice shown in Fig. 3 only permits contact of the cutoff and of the buffer bars with metal parts to prevent cantilever loading of the wood. The shape is also such as to avoid stress concentration in any sections at the ends of the bars 33 and 35.

It will now be seen that load on the body section 15 is transmitted from the wooden bars 33 and 35 to the reinforcement member 17 and from its web 19 to the legs 45 and 47 of the end fitting 43. The fitting 43 then transmits the load into the side walls 3 and for this purpose is provided with attachment means in the form of spot faced flat surfaces 71 and 73 which rest on the top face of the horizontal supporting member flange 5 and surround vertical pins 75 and 77 which loosely fit in the holes 7. It will be seen that this connection of the end fitting 43 to the support member 1 will transfer loads on the body section 15 into the side walls 3. In order to prevent undesired disconnection of the end fitting 14 from the support member 1 which would be occasioned by vertical movement of the pins 75 and 77, the fitting is provided with suitable latch means to engage the bottom of the horizontal flange 5 and lock the cross bar in position. For this purpose the end fitting 43 has a generally rectangular vertical opening 79 extending vertically through it. The side walls of the opening 79 are suitably formed to provide bearing surfaces 81 and 83 for the trunnion portions 85 of a latch member 87. The bearing surfaces 81 and 83 include a vertically extending portion 89 and the trunnions 85 are confined between this and the front end 91 of the fitting hole 79 by a pin 93 pressed through the front wall of the fitting and overlying a shoulder 95 on the latch. The latch 87 has a flange portion 97 on top which is below the top surface of the body section 15 but readily accessible at all times from the top of the bar for manual operation whereby lifting of the flange 97 will pivot the latch 87 in a counterclockwise direction as viewed in Fig. 1. Such movement of the latch 87 will move the hook-shaped bottom portion of the latch 87 including the lip 99 away from the bottom of the support member flange 5 to unlatch the cross bar. Such movement of the latch 87 is against the resistance of a bent-over flat spring 101 that is pinned at 103 to the back surface of the latch 87 and has a free end that engages a downwardly inclined surface 105 on the back wall of the opening 79. It will be seen that the spring 101 as well as gravity tends to force the latch 87 to a latching position and that by removal of pin 93 the latch 87 can be easily lifted out of the opening 79.

Because of the taper of the flanges 49 and 51 and the flanges 53 and 55 of the legs 45 and 47, there is a gradual change of area between the relatively thin web 19 and the relatively heavy body portion of the end fitting 43 surrounding the opening 79. Thus, localized areas of stress due to abrupt changes in section are substantially eliminated. The gradual change in area is furthered by making the one leg 45 longer than the leg 47 and a further step in this direction would be achieved by offsetting the rivets as indicated above in connection with the rivet hole 59b. The outer ends of the legs 45 and 47 blend into the rear of the main part of end fitting 43, the flange 47 rising to form a part of the side barrier surrounding the opening 79 while the flange 51 dropping to a level slightly lower than the chins 107 of the end fitting. It may be noted that the chins each have a curved section 109 which along with the taper 111 on the latch 87, both of which are located below the pins 75 and 77, acts to facilitate alignment of the pins with the holes. When these surfaces are placed in contact with the horizontal flange 5, the cross bar will tend to slide in a direction away from the surface 3 to drop the pins into the holes 7.

From one viewpoint it will be seen that the reinforcement member 17 and the legs 45 and 47 of the end fitting 43 can be regarded as a pair of interfitting Z-shaped members which are arranged back to back so as to provide a composite section that is substantially H-shaped. Such Z-shaped members can also be interfitted one within the other to provide telescopic movement at the other end of the cross bar as will be seen in Figs. 9 to 14 hereof. In these figures parts that have already been described will be given the same reference numbers. The part corresponding to end fitting 43 will be identified as 43' inasmuch as the construction of the extending legs differs somewhat from the previous form in order to accommodate the telescopic movement. Likewise, sides of the reinforcement member have been put on a slight angle at the telescopic end and the reference numbers thereof will now include a prime.

Turning now to Figs. 9 to 14, the telescopic end 200 has the end forging 43' with inwardly extending upper and lower legs 203 and 205 corresponding to the legs 45 and 47 and of a similar shape to them except that the vertical flanges thereof are not tapered in a longitudinal direction since their full height is needed to provide continuous contact with the sides 21' and 23' of the reinforcement element 17 even though the fitting 43' has been moved to an extended position. The leg 203 has a vertical flange 207 and a horizontal flange 208 while the leg 205 has a vertical flange 209 and a horizontal flange 210. The horizontal flanges 208 and 210 are spaced apart to provide the slot 211. The cross bolt 213 for clamping the buffer bars 33 and 35 to the web 19 of the reinforcement bar 17 passes through the slot 211 and through a suitable hole in the web 19. Thus, the bolt 213 will serve to limit the outward movement of the fitting 43' by its engagement with the curved-in end portion 215 of the horizontal flange 210 on the lower leg 205, this portion preferably extending no further than across slot 211. Obviously, the extent of telescopic movement can be controlled by the length of the slot 211 as well as by the location of the cross bolt 213. Just as in the case of the end fitting 43, the legs 203 and 205 are spaced one above the other to provide a gap that will receive the web 19 so that the bottom of the flange 208 and the top of the flange 210 will engage and slide upon the upper and lower surfaces, respectively, of the web 19.

Means are provided to make this design transmit load from the fitting 43' into the reinforcing member 17 as if the legs 203 and 205 were tied together by a cross piece rather than separated by the slot 211. While within the purview of the invention this means may take several forms, a simple and preferred method comprises the use of an end plate 217. The end plate 217 consists of upper and lower sections 219 and 221, respectively, which are connected together by a portion 223 of a width such that it will fit in the slot 211 between the legs 203 and 205. Portion 223 is received in a slight notch 225 that is cut out of the web 19 at its extreme end. The notch is preferably of a depth which is slightly less than the thickness of the portion 223, that is of the plate 217, so that the outer surface 227 of the plate 217 will project beyond the end of the reinforcement element 17. This permits the outer surface 227 to be contacted by a suitable locating member (not shown) when the horizontal upper and lower flanges 229 and 231 are spot welded at 233 to the horizontal web 19. The plate 217 can thus be readily squared up at the spot welding operation with respect to the reinforcement member 17.

The plate 217 is, of course, spot welded to the reinforcement member 17 before the fitting 43' is assembled with the reinforcement member 17. Inasmuch as the nose 215 on the fitting 43' closes the end of slot 211 it is necessary to provide a means whereby the fitting 43' can be readily slipped in place despite the plate 217. This is conveniently accomplished by relieving the leg 205 at the portion 235 so that the end face 237 and the end face 239 of the leg 203 are substantially in alignment with each other and located inwardly of the surface 215 by a distance which is at least equal to the thickness of the portion 221 of the reinforcement plate 217. This arrangement permits the fitting 43' to be inserted in place by shifting it to the right so that its axis and the slot 211 are offset to the right of the middle portion 223. When this is done the end of the side flange 23' will fit in the recess 235 and the right-hand inside corner of the surface 239 can be brought in alignment with the right-hand edge of the portion 223. The fitting 43' can then be moved axially into the reinforcement member 17 until the portion 223 is behind the surface 215, at which point the fitting 43' can be shifted to the left bringing the portion 223 into alignment with the slot 211 behind surface 215 and permitting the member 43' to be telescoped into place within the reinforcement member 17.

The peaks 241 of the vertical flanges 207 and 209 and the flat inside surfaces 243 of the horizontal flanges 208 and 210 are load transmitting surfaces which transfer forces from the flanges 203 and 205 into the turned over edges 25' and 27' and into the web 19. Consequently, the spacing or over-all height of the flanges 203 and 205 are held fairly closely in making the fitting 43'. Similarly, the inner surfaces 245 of the horizontal flanges 208 and 210 and the outermost portions 247 of the horizontal flanges are also load transmitting surfaces, transmitting loads at 245 into the connecting portion 223 of the end plate 217 and at 247 into the vertical flange portions 21' and 23' of the reinforcement member 17.

Figure 14:
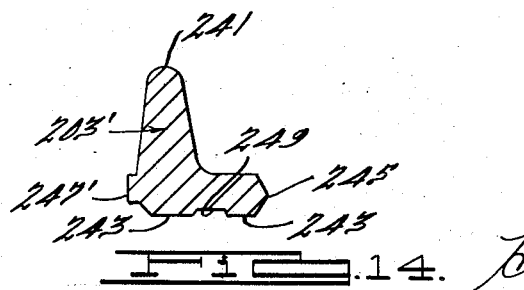
Fig. 14 is a cross section through a modified form of telescopic leg construction.

The surfaces 241 and 243 are relieved back by the formation of the recesses 249, the relief serving to accommodate cold flow of metal during the trimming or cold coining operation after forging the fitting 43' to bring the dimensions exactly to specification. Similarly, with respect to the horizontal distance between the surfaces 245 and 247, reliefs are provided at 251, 253, and 254 to accommodate dragoff of metal during the cold coining operation. Fig. 14 shows another form of cross section for a leg 203' (or 205') in which the point 247' is formed as flat surfaced projection, suitable reliefs being provided to accommodate cold flow of metal in the coining or trimming operation.

It will be seen that vertical loads on the legs 203 and 205 are transferred into the reinforcement member 17 at the web portion 19 as well as at the turned-over flanges 25' and 27'. In addition, these loads are transferred by the horizontal flanges 208 and 210 into the surfaces 255 and 257 on the end plate 217 and thence into the reinforcement web 19, e.g., an up load on 255 will be transferred at 257 into leg 205 and by it and by flange 231 into the bottom side of web 19. The side flanges of the reinforcement member 17, that is the flanges 21' and 23', are bent in a slight amount, in the neighborhood of 1°, so as to bring the point of contact between the surfaces 241 and the turned-in flanges 25' and 27' as close as possible to the radius between 21' and 25' (and 23' and 27'), thus reducing the moment of the force tending to uncurl the inturned flanges 27' and 25'.

Horizontal loads on the legs 203 and 205 are transferred into the reinforcement member 17 at the points 245 and 247. The points 245 and 247 are preferably located on a line parallel to the base surfaces 243 (i.e., web 19) and spaced above it by a distance just sufficient to clear the radius between the web 19 and the legs 21' and 23', it being desired to get the point of contact as close as possible to the web 19 and at the same time avoid inaccuracies that are bound to arise due to the difficulty in maintaining the radii at these corners to close tolerances during manufacture of member 17. It will be seen that a side load or horizontal load on leg 203 will be transmitted partly into the member 217 and thence into the web 19 via the edges of the slot 225. The load will also in part be distributed to the other leg 205 and by it into the flange or side leg 23'. The reverse will apply if there is an inwardly directed side load on leg 205.

It will now be realized that the invention has provided an improved means for connecting the end fitting to the reinforcement element 17 and an improved form of end fitting and that various modifications may be made in the details of the invention without departing from the spirit and scope thereof.

I claim:

1. In a crossbar of the type described, a body, an end fitting including a support attachment portion and a pair of independent legs angle-shaped in cross section extending in a direction parallel to the length of the bar, said legs including first flanges that extend toward each other across the width of the bar and are located adjacent a midplane of the bar, said legs having second flanges that are substantially normal to the first and which extend in opposite directions with respect to said midplane, said body having a reinforcing web engaged with each of said first flanges, said legs being spaced from each other in a direction normal to said web, one of said legs being above said web and the other being below said web and the leg above said web being substantially longer than the other leg, and means connecting said end fitting to said body.

2. In a crossbar of the type described, a body, an end fitting including a support attachment portion and a pair of independent legs extending in a direction parallel to the length of the bar, said body having a reinforcing web extending longitudinally and transversely thereof, said legs being spaced from each other in a direction normal to said web, one of said legs being disposed wholly at one side of said web and the other of said legs being disposed wholly at the other side of said web, each of said legs having a surface which engages said web and said surface of one of said legs being substantially longer than said surface of the other of said legs, and means connecting said end fitting to said body.

3. A crossbar for supporting and bracing freight in a railway freight car or the like having a pair of spaced walls and supports extending longitudinally thereof, said crossbar being adapted to extend between said spaced walls and be connected to and supported on said supports and comprising an elongated body, an end fitting including a support attachment portion and a pair of independent legs angle-shaped in cross section extending in a direction parallel to the length of the bar, said legs including first flanges that extend toward each other across the width of the bar and are located adjacent a midplane of the bar, said legs having second flanges that are substantially normal to the first and which extend in opposite directions with respect to said midplane, said body having a reinforcing portion adapted to resist bending and including a web engaged with each of said first flanges, said legs being spaced from each other in a direction normal to said web, one of said legs being disposed wholly at one side of said web and the other being disposed wholly at the other side of said web, each of said first flanges of said legs having a surface which engages said web and which has a portion of substantial length in the direction of the length of said crossbar which decreases in width adjacent the end of the leg which is remote from said attaching portion, and means connecting said end fitting to said body.

4. A crossbar for supporting and bracing freight in a railway freight car or the like having a pair of spaced walls and supports extending longitudinally thereof, said crossbar being adapted to extend between said spaced walls and be connected to and supported on said supports and comprising an elongated body, an end fitting including a support attachment portion and a pair of independent legs extending in a direction parallel to the length of the bar, said body having a reinforcing portion adapted to resist bending and including a web extending longitudinally and transversely thereof, said legs being spaced from each other both in a direction normal to said web and in a direction parallel to said web, one of said legs being disposed wholly at one side of said web and the other of said legs being disposed wholly at the other side of said web, each of said legs having a surface which engages said web and which has a portion of substantial length in the direction of the length of said crossbar which decreases in width adjacent the end of the leg which is remote from said attaching portion, and means connecting said end fitting to said body.

5. A crossbar as defined in claim 3 wherein said last named means comprises rivets connecting each of said first flanges of said legs to said web.

6. A crossbar as defined in claim 3 wherein said reinforcing portion is generally Z-shaped including a web extending transversely of said crossbar and oppositely extending side flanges and wherein said second flanges are generally aligned with said side flanges and extend from said web in the opposite direction so that said reinforcing portion and said legs co-operate to provide a generally H-shaped cross section.

References Cited in the file of this patent

UNITED STATES PATENTS

| | | |
|---|---|---|
| Re. 24,118 | Fahland | Feb. 7, 1956 |
| 2,056,704 | Anderson | Oct. 6, 1936 |
| 2,440,437 | Fahland | Apr. 27, 1948 |
| 2,468,101 | Nampa | Apr. 26, 1949 |
| 2,476,362 | Fahland | July 19, 1949 |
| 2,497,683 | Nampa | Feb. 14, 1950 |
| 2,567,658 | Stough | Sept. 11, 1951 |
| 2,769,404 | Dietrichson | Nov. 6, 1956 |